United States Patent [19]

Stone

[11] 3,769,452

[45] Oct. 30, 1973

[54] NARROW BAND TELEVISION SYSTEM

[75] Inventor: Robert F. Stone, Exton, Pa.

[73] Assignee: General Electric Company, New York, N.Y.

[22] Filed: June 8, 1972

[21] Appl. No.: 261,073

[52] U.S. Cl. ............ 178/6, 178/DIG. 3, 179/15 BA

[51] Int. Cl. .............................................. H04n 7/12

[58] Field of Search ........................ 178/DIG. 3, 6.8; 179/15 BA, 15 A, 15 BV

[56] References Cited

UNITED STATES PATENTS

| | | | |
|---|---|---|---|
| 3,342,937 | 9/1967 | Deutsch | 178/DIG. 3 |
| 3,505,467 | 4/1970 | Alpers | 178/6.8 |

*Primary Examiner*—Robert L. Griffin
*Assistant Examiner*—Joseph A. Orsino, Jr.
*Attorney*—Allen E. Amgott et al.

[57] ABSTRACT

Picture elements in a fast-scanned, or broad-bandwidth video signal are selected pseudo-randomly, and signals representative of their amplitude are transmitted over a narrow band channel to a receiver, which is equipped with a pseudo-random gating system identical in its selection pattern and synchronized with the pseudo-random selecting system in the transmitter. Because they have been transmitted over a narrow band channel the sample amplitude signals have lost their original identity in time and duration; they have been "smeared" or stretched in time. The synchronized gating system at the receiver reshapes the amplitude signal to its original duration and relative location in time, and applies it to a conventionally fast-scanned cathode ray tube, preferably with a long persistence screen. The pseudo-random selection pattern varies from one field scan to the next, so that a succession of field scans covers all the picture elements, and builds up the entire picture on the cathode ray tube at the receiver.

17 Claims, 4 Drawing Figures

NARROW BAND TELEVISION SYSTEM

BACKGROUND OF THE INVENTION

1. Field of the Invention

This invention pertains to the television art, and particularly to the art of transmitting television signals over a channel of bandwidth reduced from the original signal bandwidth, at a correspondingly reduced information rate.

2. Description of the Prior Art

Nonsequential transmission of picture elements has been disclosed for improving definition and reducing flicker by Toulon (U.S. Pat. Nos. 2,479,880 and 2,940,005) and Schlesinger (U.S. Pat. No. 2,798,114 and 2,823,258). Both lay great emphasis upon the breaking down of the picture into discrete dots. Toulon teaches transmitting alternate picture elements in one scan and then transmitting the remaining elements in the next scan; or, alternatively, he transmits a predetermined pattern using velocity modulation of his scanning beam so that it passes rapidly over elements not to be transmitted and pauses on elements to be transmitted during the given scan. Schlesinger employs a somewhat similar scheme of velocity-modulated scanning. Both of these inventors claim greatly improved definition from the fact that they transmit picture elements as dots rather than the usual continuously varying video signal of conventional scanning methods. While improvement in definition naturally implies the possibility of reducing bandwidth for given definition, neither one suggests any marked reduction in bandwidth as a possibility.

Southworth (U.S. Pat. No. 3,284,567) definitely aims at bandwidth reduction. He employs a picture element gate which moves slightly along the picture line from one scan to the next; and each picture element gated is stretched to the duration of a full line scan; repetition of this operation as the gate moves across the line produces a very slow (i.e., narrow-band) video signal. His receiving device necessarily scans at this very slow rate. His line rate must be equal to the frame rate of the fast-scan signal from which he derives his narrow-band slow signal.

Deutsch (U.S. Pat. No. 3,309,461 and 3,342,937) employs particular pseudo-random dot scanning patterns so that he may operate a camera tube and a receiving kinescope at slow frame rates, with correspondingly low bandwidth, without objectionable flicker. His purpose and result are different from those of Mayle (U.S. Pat. No. 2,472,774) who teaches the use of random scanning for security purposes, and of Stillwell (U.S. Pat. No. 3,472,959) who teaches am embattled or crenelated scan for improved facsimile transmission of manuscript. Kamen et al (U.S. Pat. No. 3,518,376) disclose, as part of a multiplex transmission system for audio and video signals, a band-width reduction system in which a single picture element from each line is transmitted during a given frame scan, the same picture element, numerically, in each horizontal line being transmitted during a given frame scan so that a vertical line of dots is sent in each frame scan. Thus a vertical line of picture elements sweeps across the receiving tube screen once each 5 seconds; a long-persistence screen is employed to ameliorate the flickering crawl which such a method necessarily produces.

SUMMARY OF THE INVENTION

A fast scan television signal — that is, one relying for apparent continuity of motion upon the presentation of picture elements at a rate above the flicker frequency, which may be an NTSC standard television signal — is sampled in a pseudo-random but actually predetermined fashion. Each sample of the video signal consists ideally of a single picture element; and successive samples are spaced apart in time by a period sufficiently great so that the information rate represented by the samples is within the transmission capabilities of a narrow band transmission channel which could not transmit the fast scan signal. Each sample is stretched in time so that it approaches but does not reach the time of the taking of the next sample; and these stretched samples are transmitted over the narrow band channel to a receiver. The receiver uses conventional scanning means which scan its picture reproduces at a rate appropriate to the fast scan signal; the usual or equivalent vertical and horizontal synchronizing signals may be added to the stretched samples in usual cases. However, the stretched samples cannot be applied directly to control the brightness of the picture reproducer so scanned, since they would appear as wide smears having the brightness of the picture element each represents. Therefore there is provided at the receiver a pseudo-random gating system which may be identical with that employed to sample the original fast scan signal, with which it is synchronized. This second gating system gates from each stretched sample a portion of time duration equal to that of the picture element originally sampled, and applies that narrow signal to the brightness control electrode (in a conventional kinescope, the control grid) of the picture reproducer. The scattered samples are thus reproduced in their prior location in the picture. However, they are only a small fraction of the number of elements in the complete picture. The pseudo-random sampling pattern varies from one fast-scan field to the next so that all the picture elements are sampled in a finite number of fast-scan fields. The sampling pattern is then repeated; the term pseudo-random is employed to describe the pattern because, although it is actually predetermined by the circuitry employed, the period of an entire picture cycle, in which each picture element is sampled once, is so long that even the subconscious perception of an observer does not detect its repetitive nature. Since the presentation of all the elements of a picture occurs with a frequency which in general is below the flicker frequency, the kinescope or other picture reproducer preferably has an appropriately long persistence, so that the illumination of a picture element endures substantially until the same element is sampled again.

An advantage of this invention over the prior art is that it is possible to employ it with various interlacing schemes and various line and frame standards, using receivers which are provided with scanning means appropriate to whatever fast scan system provides the original fast scan signal. The pseudo-random sampling or gating system is a separate entity which may be added to a standard television monitor or receiver. Scanning systems are usually very much ad hoc to particular picture standards, and avoiding the provision of non-standard scanning systems is a distinct economic advantage. Also, although it is possible to encode the amplitude of the sampled signal and transmit it digitally at a rate appropriate to the channel bandwidth, it is advantageous that the signal from this system can be transmitted as an analogue signal by any conventional analogue modulation system.

The pseudo-random sampling must not in fact be truly random because it must be capable of being duplicated by equipment at the receiving station with no more information than is supplied by synchronizing pulses. The method of my preferred embodiment employs a sampling oscillator operating at the basic sampling frequency, i.e., the frequency determined by the number of samples to be taken in a single fast horizontal scan; a horizontal line is divided for this purpose into a number of equal segments from each of which one sample is taken. Since this sampling frequency is an integral multiple of the horizontal sweep frequency, the sampling oscillator's output may be counted down to the horizontal sweep frequency, fed back, and phase locked with the horizontal sweep frequency in a conventional phase-locked loop. This produces a counted-down frequency synchronous with the horizontal sweep of the incoming fast-scan signal. The output pulses from the sampling oscillator mark the boundaries of each segment in the horizontal line from which one sample will be taken; but it is necessary to provide further for pseudo-random sampling within such a segment. The necessary precessing cyclical function is produced by using a sampling counter, driven in the present invention at the horizontal scanning frequency, whose total count is incongruent with the total number of horizontal lines in a frame. This insures that if the sampling counter has a given registration when the first line is swept in a given frame, it will have a different registration when the first line is swept in the next frame. The remainder produced when the number of lines in a frame is divided by the total count of the sampling counter should be such that, for successive triggerings of the first line of the raster, the sampling counter will pass through all its possible registrations. In the preferred example the total count of the sampling counter is sixteen; i.e., in binary coding, from 0000 to 1111. The sampling counter outputs are connected to the control inputs of a function table, of the type known more specifically as a data selector or multiplexer, which has 16 different signal output channels, any one of which will be connected to its input terminal, depending upon the signals applied to its control inputs. Thus for each given horizontal scan, which produces a given registration in the sampling counter, a given signal output will be connected to the multiplexer input. A drive pulse from the multiplexer input to such an output is employed to gate or select a particular picture element in a line segment, from the 16 in my preferred embodiment. Selection of a particular picture element is a matter of timing; the later in the time of scanning through a line segment the gate is opened, the farther along the segment will be the picture element sampled. Since drive pulses at different times are to be provided by connection to the 16 outputs of the multiplexer, I employ to this end a tapped delay line having sixteen equally spaced taps, spaced ¼ microsecond apart in the described embodiment, with a total delay of 4 microseconds, which is the approximate time duration of a line segment. These 16 taps are connected to the various signal outputs of the multiplexer; and at the beginning of each line segment a drive pulse fed into the delay line at its *n*th tap from a multiplexer output provides a signal at the delay line output terminal $n \times \frac{1}{4}$ microseconds after the beginning of the line segment. Since, as has been described, a given horizontal line scan will occur with a single particular setting of the sampling counter, that delay line input which is selected by the particular counter setting will receive the drive pulse from the selected output of the multiplexer. This pulse, delayed, will appear as a gating pulse at the output of the delay line. If, for example, the seventh tap from the output of the delay line is connected to the enabled multiplexer signal output, then the seventh picture element in each of the segments for that particular line scan will be sampled. Since in a number of scans the counter passes through all its possible registrations, each delay line tap will be fed a drive pulse at some scan over a given line, and all the picture elements in each segment in that line will ultimately be sampled. In order to increase the apparent randomness or "scatter" of the sampling in a given line segment, the taps on the delay line are preferably connected to the signal output terminals of the multiplexer in a scrambled fashion instead of their strict numerical sequence. It is possible to replace the binary sampling counter and multiplexer with a ring counter whose individual outputs are each connected to a gate to which a given delay line tap is connected. The commercial availability of binary counters and multiplexers as compact integrated units renders the binary counter plus multiplexer practically preferable; there is no particular technical advantage of one over the other so far as operation is concerned. Similarly, it would be possible to repace the tapped delay line with a source of 4 megahertz clock pulses stepping a 16-bit shift register, to whose successive stage inputs the function table outputs are connected. But as this is more complex and expensive of apparatus, I do not prefer it, although it does offer the advantage that the delay provided by such a register can be altered by altering the clock pulse frequency. I have found that the delay produced by a conventional delay line having fixed taps is sufficiently accurate for my purposes, and the possibility of adjusting delay in such a manner is superfluous.

As an additional refinement in producing adequate apparent randomness of sampling, I also teach how to cause the sampling counter to register alternately increasingly during one-half of a slow frame, and decreasingly during the next. This has the virtue that it adds to the complexity of the sampling pattern (since the term pseudo-randomness or apparent randomness really describes simply a sampling pattern too complex for the observer's mind to grasp it from observation of the sampled picture) in a manner which can be accurately reproduced at the receiving apparatus.

It is evident from the foregoing that the sampling operation performed at the transmitting apparatus must be duplicated at the receiving apparatus; but the means for doing this, in so far as they differ from those used in the transmitting apparatus, may best be understood from the description of the preferred embodiment.

DESCRIPTION OF THE PREFERRED EMBODIMENT

Figure 1:
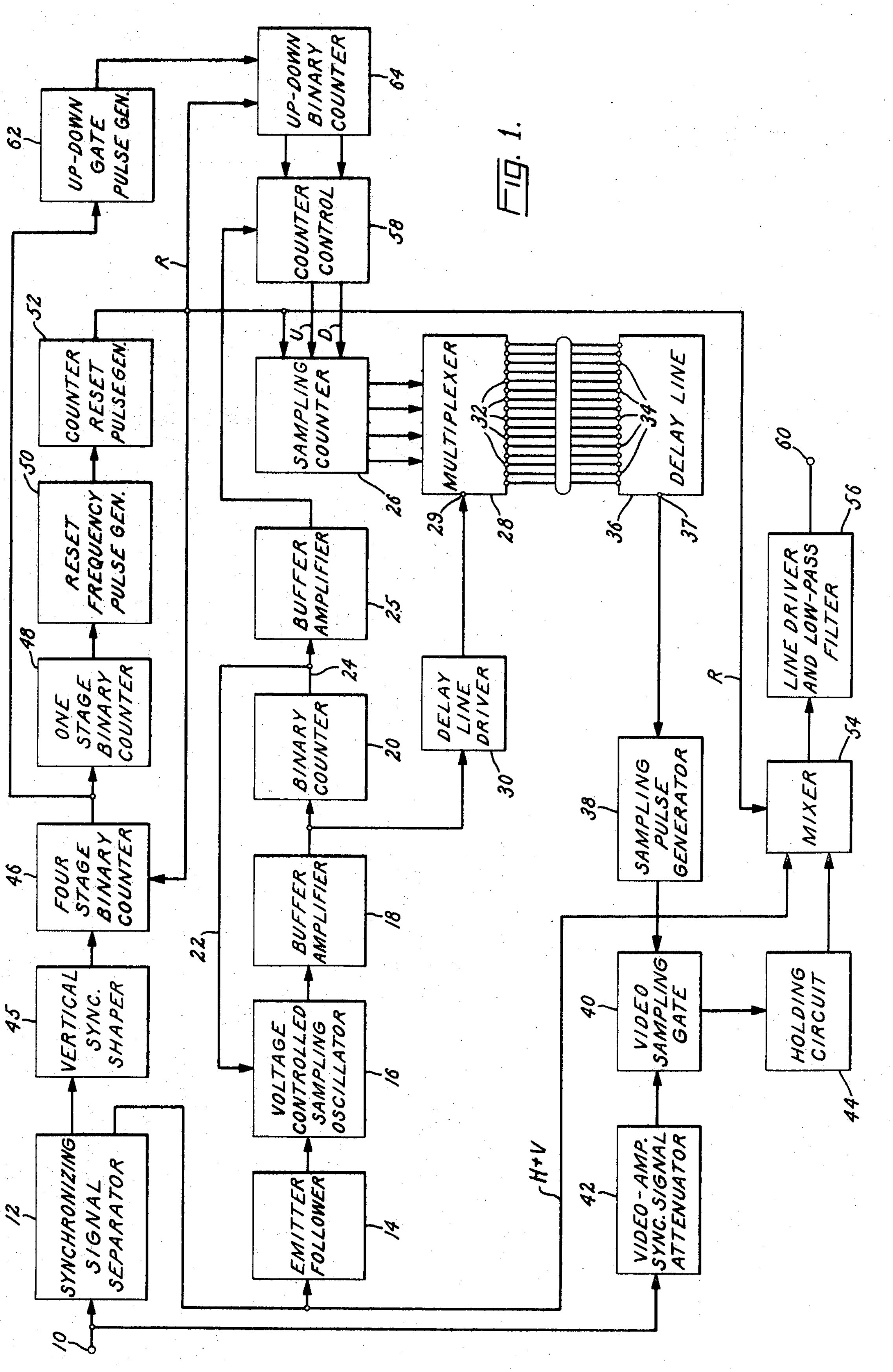
FIG. 1 represents in block diagram form the transmitting equipment of the preferred embodiment.
Figure 2:
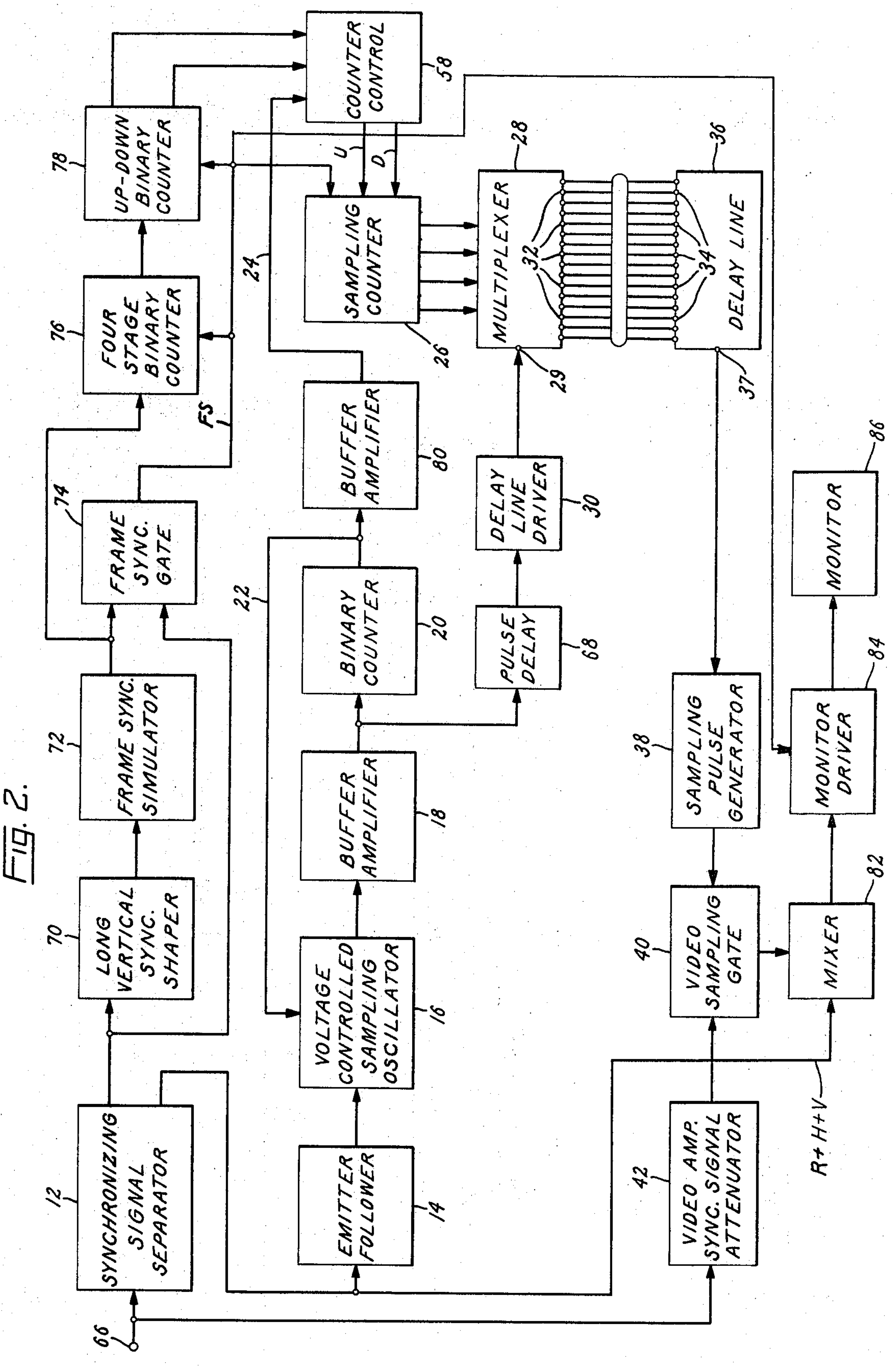
FIG. 2 represents in block diagram form the receiving equipment of the preferred embodiment.

FIG. 1 represents schematically in block diagram form the preferred embodiment of the transmitting station apparatus of my invention, for use with the receiving apparatus of FIG. 2. In FIG. 1, a standard fast-scan television signal, which for simplicity will be assumed to be a NTSC black-and-white signal, is provided at terminal 10, which is connected to a synchronizing signal separator 12, conventional in the art, which feeds the separated horizontal and vertical synchronizing pulses via emitter follower 14 to a voltage-controlled sampling oscillator 16, operating at 252 kilohertz, which is 16 times the frequency of the standard horizontal synchronizing signal (15,750 hertz). (Emitter follower 14 is preferably conductively or "d-c" coupled; this insures that synchronization of sampling oscillator 16 will not be impaired by any deterioration in the waveform fed to it.) The output of sampling oscillator 16 is fed through buffer amplifier 18 to a four-stage binary counter 20, which effectively divides it by 16 giving a 15,750 hertz signal which is fed back via channel 22 to sampling oscillator 16, forming a phase-locked loop. The same signal is fed via channel 24, buffer amplifier 25, and counter control 58, to the input of a four-stage binary sampling counter 26, whose stage outputs are fed to the control inputs of multiplexer 28. Multiplexer 28 is a conventional function table which receives a pulse at its common terminal 29 from delay line driver 30, and transmits the pulse to a selected one of its sixteen output terminals, generically designated as 32. The selection of the particular terminal 32 is determined by the potentials applied by sampling counter 26 to the control terminals of multiplexer 28. Thus as sampling counter 26 passes through its sixteen possible states, the common terminal 29 of multiplexer 28 is successively connected to each of the output terminals 32 in turn. The term multiplexer derives from the common use of such function tables in time-shared multiplex telegraphy.

Delay line driver 30 is a monostable device, colloquially a one-shot multivibrator, which, when it receives an input pulse from the output of buffer amplifier 18, produces responsively thereto an output pulse approximately ¼ microsecond long, which is applied through multiplexer 28 to a selected output terminal 32 of the latter. Each such output terminal 32 of multiplexer 28 is connected to one and only one of the 16 taps 34 of delay line 36. Preferably these connections are not regular, or one-to-one in sequence, but are pseudo-random for a purpose which will appear subsequently. There is described hereinafter a connection scheme which has been found highly satisfactory, although it must be recognized that the satisfaction to be achieved is that of a human viewer, and is thus subjective.

In any event, when delay line driver 30 is triggered by a pulse from buffer amplifier 18, its output is applied, through multiplexer 28 to some output terminal 32 which is selected by the state of sampling counter 26. The pulse from delay line driver 30 is thus applied to some tap 34 which, in the pseudo-random scheme, is connected to the selected output terminal 32. It then passes with a time delay to the common output terminal 37 of delay line 36 to the input terminal of sampling pulse generator 38, the time it takes to do this depending exclusively upon the particular tap 34 to which it is applied. Responsively to the reception of the pulse from the common output terminal 37 of delay line 36, sampling pulse generator 38 (another conventional monostable device alias one-shot multivibrator) produces an enabling output or sampling pulse which opens video sampling gate 40 for a period, approximately ¼ microsecond in the present case, which is approximately the duration of a picture element. Delay line 36 has 16 taps spaced from each other in time by ¼ microsecond, giving a total of 4 microseconds delay, corresponding substantially to the interval between successive pulses from delay-line driver 30 (which is itself driven at 252 kilohertz).

The original fast-scan (or, alternatively, wide-band) television signal available at terminal 10, is fed into the input of video amplifier and "sync" signal attenuator 42. This is a conventional device which attenuates or suppresses the synchronizing signals and amplifies only the video portion of the composite signal. This amplified video signal is then fed to video sampling gate 40. When the ¼ microsecond sampling pulse from sampling pulse generator 38 opens video sampling gate 40, the picture element which is being presented to the gate 40 at that instant passes the gate 40 to holding circuit 44. Holding circuit 44 may conveniently be a capacitor which is charged to the potential of the sampled video signal element, and will remain at substantially that potential until the next operation of video sampling gate 40 changes its potential to that corresponding to the next sample of video signal.

The apparatus thus far described will pseudo-randomly sample picture elements from a fast-scan video signal, stretch there in time, and feed the stretched signals to the narrow-band channel. This merits detailed explanation of the operation. For brevity, some blocks will be described at times only by their reference numbers. The loop of items 16, 18, 20, and 22 is conventional. It is synchronized with the horizontal synchronizing signal of the fast-scan television signal provided at terminal 10, and provides on channel 24 a square wave of 15,750 hertz, which, via buffer amplifier 25, steps, and so is counted by, sampling counter 26. Sampling counter 26 is connected to drive the control connections of multiplexer 28.

In a conventional television system, such as provides the input signal to terminal 10, the scanning speed is equal to the rate of arrival of picture elements — that is, the beam moves from one element location to the next at the rate at which signals characterizing those elements arrive. In a conventional two-line interlaced system, the odd-numbered lines of the whole raster which forms a complete picture are first scanned, covering the boundaries of the picture, so that such a scanning is called a field; but since it takes two successive such fields, one of the odd-numbered raster lines and one of the even-numbered raster lines, to provide all the elements of a picture, by adoption from the related motion-picture art of the term for a single photograph, the total number of fields required to furnish all the elements of a single picture is called a frame. For a two-line interlaced system a frame is composed of two fields; in a three-line interlaced system a frame would consist of three fields.

In the present invention in which non-adjacent picture elements are successively sampled by a system which scans at the scanning rate of the original wide-band television signal, the field rate is the same as that of the original signal; but because it requires a much greater number of fields to complete the sampling of all the picture elements in a frame, the frame rate of the sampled narrow band system is correspondingly lower.

Figure 3:
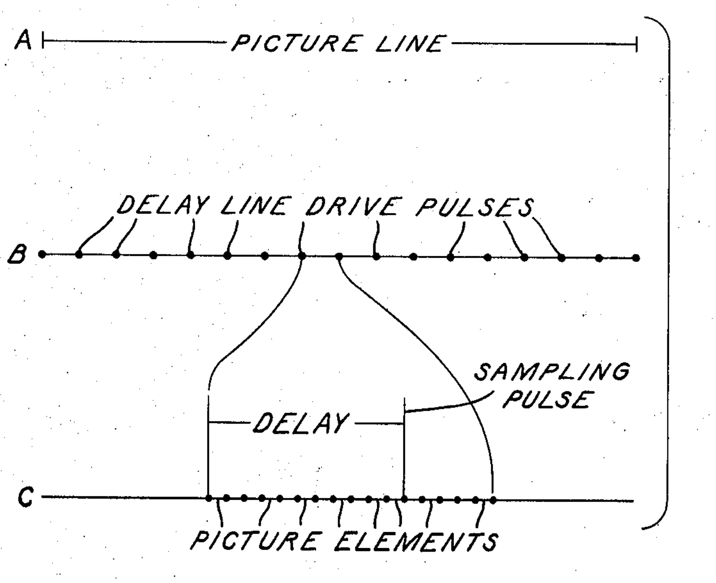
FIG. 3 represents certain time relationships useful in understanding the explanation of the preferred embodiment.

FIG. 3 is a schematic representation of the time relations involved. Line A represents, with a horizontal time scale, the duration of a single picture line. The time of occurrence, in such a line, of the 252 kilohertz delay line drive pulses from delay line driver 30 is represented by dots on line B. It may be seen that these pulses divide the single line into 16 horizontal segments. Line C represents on an expanded scale a single such segment, which is composed of 16 picture elements, shown as bounded by dots. The actual time of occurrence of a sampling pulse produced by sampling pulse generator 38 is delayed after the occurrence of a delay line drive pulse by a time depending upon the delay produced by delay line 36 in transmitting the delay line drive pulse to sampling pulse generator 38. This delay is determined by the particular one of the taps 34 to which multiplexer 28 transmits the delay line drive pulse. This in turn is determined by the state of sampling counter 26. Since sampling counter 26 is not stepped during the time of a picture line, being stepped synchronously with the horizontal scan, the particular tap 34 which is in use during the scanning of a single picture line will be in use during the scanning of all 16 the segments bounded in time by the delay line drive pulses, and the delay will thus be the same for all 16 segments during the scanning of that line. Thus, if the delay is such that the 12th picture element is sampled by the operation of sampling pulse generator 38, the twelfth picture element will be sampled in each of the 16 line segments in that line during that scan. (This uniformity of spacing between successive samples in a line has the practical advantage that they may be as close together as is compatible with the bandwidth of the narrow band channel, so that its time-bandwidth capabilities are fully exploited.) Since sampling counter 26 will be stepped before the scanning of the next line, a different tap 34 will be in use during that scan, and a numerically different picture element will be sampled in each of the 16 line segments of that line; but the number of the picture element sampled will be the same in all 16 segments of that line. If this procedure continues through one field of odd-numbered raster lines and another of even-numbered raster lines, one whole fast-scanned frame will have been sampled; but since only 16 picture elements are sampled in each line out of the 256 elements that each line contains, the total samples will be of only 1/16th of the total elements in the whole picture constituted by the fast-scanned frame. Thus 16 fast-scan frames must be sampled to provide one slow-scan frame. Consequently the slow-scan frame (or, briefly, slow frame) frequency is 1/16th that of the standard fast-scanned frame, 1/16th of 30 hertz, or 1.875 hertz.

In order that all the elements in a given line, e.g., the first line, shall be sampled, it is necessary that the delay between the delay line drive pulse and the sampling pulse be different in each of 16 successive scans of that first line. This occurs automatically from the fact that the sampling counter 26 is stepped once for each horizontal line; and there are 525 horizontal lines per frame. Since sampling counter 26 counts modulo 16 — that is, its maximum registration is 16, if it reads zero on the first scanning of the first line, it will read zero every 16 lines beyond the first up to and including the 513th; at the 525th it will read 12, and at the first line of the second fast-scanned frame it will read 13, so that it will cause multiplexer 28 to connect the delay line drive pulse to a different tap 34 of delay line 36, causing a different delay in the production of the sampling pulse. It may be shown that in 16 successive fast-scan frames, scanning counter 26 will have a different value each time the first line is scanned; and similarly for every other line. This results from the fact that the difference between 16 and 525, 509, is a prime number.

Since it is of the essence that the sampling proceed in such a manner that the eye will not readily detect a pattern in the picture elements presented at nearly the same time (as during the sampling of a single fast-scan field), it is not desirable that the ordinal numbers of the picture elements sampled in successive lines should, e.g., increase by one, so that the first element of each line segment is sampled in the first line, the second element of each line segment in the next line, and so on. This would produce the visual impression of a rapid succession of almost vertical lines; but this is what would occur if the first terminal 32 of multiplexer 28 were connected to the first terminal 34 of delay line 36, the second terminal 32 to the second terminal 34, and so on. To avoid this, the interconnections between these groups are "randomized." A connection pattern which has been found satisfactory is the following:

| Terminal Number of Multiplexer 28 | connected to | Terminal Number of Delay Line 36 |
|---|---|---|
| 1 | | 1 |
| 2 | | 8 |
| 3 | | 12 |
| 4 | | 4 |
| 5 | | 14 |
| 6 | | 6 |
| 7 | | 10 |
| 8 | | 2 |
| 9 | | 15 |
| 10 | | 7 |
| 11 | | 11 |
| 12 | | 16 |
| 13 | | 13 |
| 14 | | 5 |
| 15 | | 9 |
| 16 | | 3 |

Figure 4:
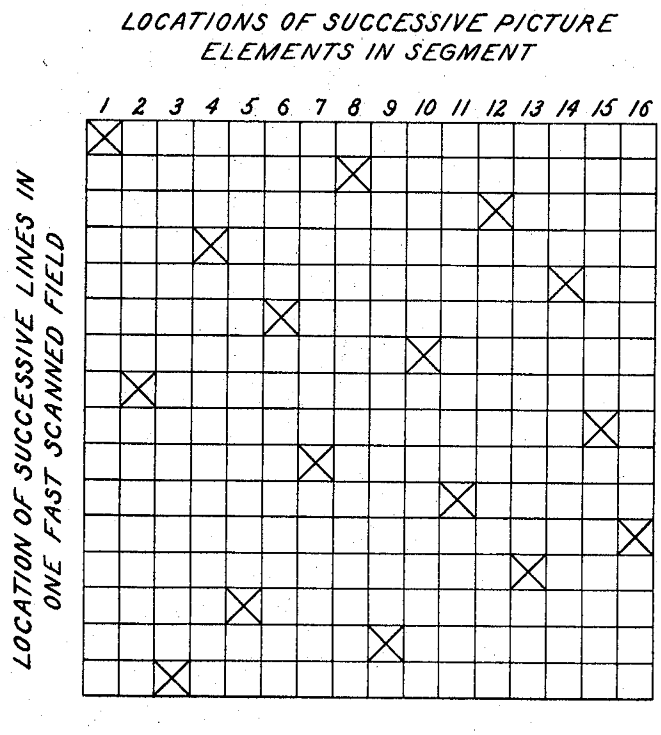
FIG. 4 represents certain spatial relationships of picture elements useful in understanding the explanation of the preferred embodiment.

Since this scheme is offered as an example of a suitable pseudo-random connection arrangement, it does not matter from which end of the multiplexer 28 and the delay line 36 one begins counting, providing only that the numbering of the terminals of multiplexer 28 represents the order in which terminals 32 of multiplexer 28 are successively connected to its common connection by successive steps (either increasing or decreasing) of sampling counter 26, and the numbering of the terminals of delay line 36 represents the order of the taps 34 along the delay line. Indeed, in order to heighten the apparent randomness of the sampling, means are provided to cause the sampling counter 26 to count first increasingly, or forward, to its full registry, and then to count decreasingly, or backward. Such reversal of the direction of counting has precisely the same effect as if the order of numbering either the terminals 32 or the terminals 34 were reversed. Other means of modifying the count sequence may be employed, FIG. 4 represents a portion, 16 lines high and 16 picture elements (i.e., one segment) wide, of a field scanned once in accordance with this connection scheme. This pattern is repeated across the 16 line segments during a given fast scan of a field, and also is repeated for each 16 vertical lines down the field. The stepping of sampling counter 26 causes this pattern to precess vertically in successive first scans so that the apparently random sampling pattern represented by FIG. 4 ultimately (that is, in 16 fast scanned frames) covers every picture element just once. It may be seen, so far as it is possible to represent the phenomenon by static representation, that there is no easily identifiable pattern which the normal observer's eye and brain will identify, any more than a normal ear and brain will identify the harmonic components of a slowly repeated pattern of random noise. The very fact that this particular pattern has the virtue of apparent randomness indicates, of course, that other apparently random patterns may be equally satisfactory. On the other hand, nut all randomly generated patterns will be satisfactory, since the totality of all equally probable permutations of the available parameters will necessarily include those which have a readily identifiable pattern which it is sought to avoid. FIG. 4 represents the most satisfactory pattern found thus far. The periodic reversal of the direction of counting by sampling counter 26 has the effect of periodically inverting the pattern of FIG. 4, top-to-bottom, which heightens the deception of the eye.

Since it is of the essence of the invention that the sampling sequence at the transmitter be duplicated exactly at the receiver, it is necessary to insure that the sampling counter 26 be reset periodically to a reference value, such as 0000, by some event in the signal which will also be available at the receiver so that the corresponding sampling counter at the receiver may be reset simultaneously. Since arbitrarily resetting the sampling counter during the sampling of a field would be likely to interfere with the pseudo-randomness of the sampling program, I perform this operation at the end of a slow frame, during the vertical retrace period when the trace at the kinescope or other picture reproducer is blanked out.

Vertical "sync" shaper 45 is a monostable device which is triggered by the somewhat rounded leading edge of the vertical synchronizing pulse from synchronizing signal separator 12, and produces a reshaped pulse which is applied as an input to step four-stage binary counter 46, whose output is 1/16th of the 60 hertz frequency of the vertical synchronizing signal, or 3.75 hertz. This output is applied to one-stage binary counter 48, which produces an output one-half of 3.75 hertz, or 1.875 hertz, which is the frequency of the slow-scan frame.

The output of counter stage 48 (which is actually the carry pulse of the last stage of the five-stage counter 46 and 48) is fed to the input of reset frequency pulse generator 50 — another conventional monostable circuit whose approximately 1-millisecond long output is fed to counter reset pulse generator 52 — yet another monostable circuit, which produces an approximately rectangular pulse ½ millisecond long. The reason for the otherwise inane cascading of two monostable circuits is the necessity for time delay. Monostable circuit 45 is triggered on by the early rise in the leading edge of the vertical synchronizing pulse from 12. Since the output of 40 is about a millisecond long, the time required by counter chain 42–44 to count such an output is negligible compared with its 1-millisecond duration. Reset frequency pulse generator 50 is designed to be triggered by the trailing edge of the output of counter stage 48; and counter reset pulse generator 52 is triggered by the trailing edge of the ouput of 50. Thus the leading edge of the approximately 0.3 millisecond output of counter reset pulse generator 52 occurs about 2 milliseconds after the leading edge of the vertical synchronizing signal from synchronizing signal separator 12. This insures that the output of 52 will lie safely within the retrace period of the signal. The 1.875 hertz output of counter reset pulse generator 52 is connected to the reset terminal of sampling conter 26, so that the counter is reset at the end of every slow frame. The same output is also fed to an input of mixer 54, which is simply a conventional mixer, to which there are also fed the output of holding circuit 44, and the horizontal and vertical synchronizing signals which are outputs of synchronizing signal separator 12. The mixed signal incorporating all of these is fed to line driver 56, which preferably also incorporates a low-pass filter to eliminate any components lying outside of the pass band for which the system has been designed. It has been found useful to connect the output of counter reset pulse generator also to reset four stage binary counter 46 to zero, to determine certainly its stage at the beginning of a slow frame.

One additional refinement remains to be described. Sampling counter 26 is preferably a reversible counter which will count forward or backward depending upon which of two control terminals is excited. Such counters are commercially available in the form known as integrated circuits. Specifically, The Texas Instruments Corporation, of Dallas, Texas, furnishes such a device in a unit identified commercially as SN74193. This counter is provided with two separate input or stepping terminals. Signals applied to one such terminal cause the counter to step in one direction, and signals applied to the other such terminal cause the counter to step in the opposite direction. It has been found that it is desirable to have the sampling counter 26 count in one direction in sampling the first half of a slow frame (32 fast-scan fields) and to have it count in the opposite direction in sampling the second half of a slow frame, as this reduces the tendency for the observer to feel that he sees a "crawling" of the reproduced picture. The 3.75 hertz output of four-stage binary counter 46 is suitable in frequency and phase to time the reversals of counting direction, and this output is therefore fed to up-down gate pulse generator 62, which is a monostable device which introduces a delay of approximately 1.3 milliseconds before producing an output which is connected to step up-down binary counter 64, which is a single-stage binary counter. The two complementary outputs of up-down binary counter 64 are connected to counter control 58. Counter control 58 is simply two gates which both receive as an input to be gated the output of buffer amplifier 25, which is simply the buffered and amplified output of binary counter 20. According to the "zero" or "one" state of up-down binary counter 64, the output of buffer amplifier 25 is transmitted to one or the other of the channels marked U and D, which are connected to sampling counter 26 and cause it to step either "up" — that is, to increase its count, — or "down" — that is, to decrease its count. Since it is essential that the homologous sampling counter 26 in the receiving system count up when the sampling counter 26 in the transmitting system counts up, and count down when the said sampling counter in the transmitting system counts down, the output of counter reset pulse generator 52 is also fed to mixer 54, and thus becomes available at the receiving installation for a similar use.

The effect of having sampling counter 26 operate bidirectionally is that the order of successive samplings of a given line segment is reversed between successive halves of a slow frame, reducing (as has been stated) any tendency of the reproduced picture to "crawl". If this refinement is omitted, with sampling counter 26 counting only in one direction, counter control 58, up-down gate pulse generator 62, and up-down binary counter 64 may be omitted, the output of buffer amplifier 25 may be connected to step sampling counter 26 directly, and the system will still operate. In either case, output terminal 60 is connected to a narrow-band circuit which feeds a receiving system, represented in FIG. 2.

FIG. 2 (the receiving system) has many components wich may be physically indistinguishable from their counterparts in FIG. 1, and will in any event be electrically identical. This reflects the fact that the receiving embodiment must duplicate the scanning pattern of the transmitting embodiment; but there is not complete identity because the receiving embodiment must identify and imitate certain actions which the transmitting embodiment initiates.

Referring first to the components common to FIGS. 1 and 2, but with respect specifically to their function in FIG. 2, reference items 14, 16, 18, 20, and 22 form a phase-locked loop, driven by a horizontal synchronizing signal separated out by synchronizing signal separator 12. This horizontal synchronizing signal, it should be noted, is the one which was added to the signal which ultimately appears at terminal 66, by being fed to mixer 54 of FIG. 1, after being separated, by synchronizing signal separator 12 of FIG. 1, out of the original fast-scan signal provided to terminal 10. Thus it is actually the original horizontal synchronizing signal of the fast-scan signal; this is possible because the synchronizing signal is much longer than the individual picture element signals of the original fast-scan signal, and can thus be transmitted over a narrow-band channel.

Delay line driver 30 of FIG. 2, unlike the same unit of FIG. 1, is not driven directly from the output of buffer amplifier 18. A given picture element signal stored in holding circuit 44 of FIG. 1 and transmitted over the narrow band channel connecting terminal 60 with terminal 66 will be distorted, rising only slowly to its full value. Therefore pulse delay 68 is inserted between the output of buffer amplifier 18 and the input to delay line driver 30, to provide a delay (preferably adjustable) of approximately 25 to 75 percent of the duration of the stored picture element. This insures that the receiving system will operate upon transmitted picture elements only after they have reached substantially their maximum value. Pulse delay 68 may conveniently be a monostable circuit which is triggered by an input pulse from the output of buffer amplifier 18, and then, in returning after the required delay to its untriggered state, produces a pulse which triggers delay line driver 30.

Sampling counter 26 and delay line driver 30 are both connected to multiplexer 28, which is connected to a delay line 36, whose common output terminal 37 is connected to the input of a sampling pulse generator 38. The manner of functioning of these reference items is identical with their functioning in FIG. 1; indeed, the particular pattern of connection of terminals 32 of multiplexer 28 to terminals 34 of delay line 36 must be identical with the corresponding pattern of connection in FIG. 1. Counter control 58 determines the direction in which sampling counter 26 will count just as its twin does in FIG. 1.

However, the circuitry employed in FIG. 2 to operate counter control 58 must differ from that employed for the same purpose in FIG. 1. Special means must be employed to insure that the resetting of sampling counter 26 and of the devices which determine the direction of its counting will be properly synchronized with similar operations in the transmitting apparatus of FIG. 1.

The vertical synchronizing pulses from synchronizing signal separator 12 of FIG. 2 are fed to long vertical "sync" generator 70. This is a monostable device which, when triggered, produces an output of about 1.1 milliseconds duration, appreciably longer than the duration of the vertical synchronizing signal in the standard fast-scan signal. Since it produces such an output without regard to the duration of the trigger, it does not merely reshape its input; it generates a long vertical synchronizing signal whenever it is triggered, without the serration pulses which appear in the NTSC vertical synchronizing pulse for a purpose not required here.

Its output is connected to frame "sync" simulator 72, which is triggered by the trailing edge of the output of 70, and produces an output pulse of about 0.2 milliseconds duration. Since 72 will always do this, whether or not there was an actual reset signal in the output of synchronizing signal separator 12, it merely simulates the frame "sync" pulse. Therefore both the simulated output of 72 and the vertical synchronizing signal output of 12 are fed to two inputs of frame "sync" gate 74. When there is only a 1.1 millisecond vertical synchronizing signal from 12, this will cease before the simulated output from 72 occurs, and frame "sync" gate 74 will produce no output. But when the output from 12 is prolonged by the 0.3 millisecond reset pulse from counter reset pulse generator 52 of FIG. 1, injected by mixer 54 (which synchronizing signal separator 12 of FIG. 2 will separate), its last 0.2 milliseconds will coincide with the simulated output of frame "sync" simulator 72, and frame "sync" gate 74 will produce an output. This output is fed to reset sampling counter 26, four-stage binary counter 76 and up-down (single stage) binary counter 78. Thus, whatever the state of these counters when the receiving apparatus of FIG. 2 is turned on, or first connected via its terminal 66 to the terminal 60 of FIG. 1, some time in the first 1/30th of a second after such an event there will be a reset signal which will cause frame "sync" gate 74 to reset all these counters of FIG. 2 to zero, so that their states correspond to those of the counters of FIG. 1, and the two systems will operate in synchronism. Since the output of frame "synch" simulator 72 occurs at the frequency of the vertical synchronizing signals, i.e., 60 hertz in the present instance, its output is also used to drive four-stage binary counter 76, whose output in turn drives up-down single stage binary counter 78, producing a 1.875 hertz output from 78. The two complemented outputs of up-down counter 78 are connected to counter control 58, and control the direction of its counting just as in FIG. 1. The output of binary counter 20 is employed to furnish the stepping pulse to sampling counter 26 as in FIG. 1, but it has been found desirable to insert buffer amplifier 80 as indicated in FIG. 2 to provide isolation of the phase-locked loop from events in counter control 58.

Thus it has been established that sampling counter 26 of FIG. 2 will be caused to count in synchronism with sampling counter 26 in FIG. 1; and it will cause multiplexer 28, through its connections to delay line 36, which are identical to the connections between the same components of FIG. 1, to open video sampling gate 40 for a period equal to the duration of the picture element sampled by video sampling gate 40 of FIG. 1, since sampling pulse generator 38 is identical in FIGS. 1 and 2, and produces the same short sampling pulse. The picture element signal from video amplifier and synchronizing signal attenuator 42 of FIG. 2 will, as has been noted several times in the preceding discussion, be much longer than this period; but only the proper narrow portion of it will be passed by video sampling gate 40 to mixer 82, which differs from its homologue 54 of FIG. 1 in having only two input terminals, for the gated output of video sampling gate 40 and for the reset and horizontal and vertical synchronizing signals from synchronizing signal separator 12. The reset pulse transmitted from reference 52 of FIG. 1 has no use at this point, and indeed tends to produce some jitter in monitor 86 by its action on the monitor's vertical "sync" recovery circuit. The output of frame "sync" gate 74 is sufficiently close in time and duration to the undesired reset pulse so that it may be applied to cancel it. It could be so applied at mixer 82, but in an embodiment actually built the output of frame "sync" gate 74 was opposite in polarity to the reset signal in the output of mixer 82, and of suitable magnitude to cancel it when applied by resistive coupling. Monitor driver 84 furnished a convenient point for such connection, and it is so represented. Monitor driver 84 is a simple amplifier whose output is fed to monitor 86. Monitor 86 may be either a monitor of the kind employed in television transmitting stations for viewing the composite of synchronizing signals and video signals prior to its application of the modulator of the radio-frequency transmitter; or it may be a conventional television receiver which has been modified only by provision of connection to its post-detection system, leading to the inputs of its synchronizing signal separator and video amplifier circuitry. In either case, the video signal circuits must be of the broad bandwidth required for fast scanned conventional video signals, and the scanning is at the fast scan rate required for a conventional NTSC 525-line picture; the one desirable modification from standard practice is that the cathode ray tube employed for presenting the picture be of a long persistence kind, such as the P7, rather than the conventional medium persistence P4. There is a practical economic advantage in the possibility of using a conventional television receiver in that such receivers, despite the additional cost of their radio-frequency receiving portion, are usually cheaper than the higher quality station monitors, which have a necessarily much smaller market; and furthermore, such a receiver is alternatively usable to receive conventional television signals from an antenna.

The slight delay interposed by pulse delay unit 68 will cause the received and sampled picture elements to be slightly delayed relative to the horizontal synchronizing signals. This must cause effectively a slight shifting of the entire picture to the right; but the effect is of such small magnitude that it has in fact not been noticed even by observers familiar with the mode of function of the system. If it should be of importance in any particular application, a conventional delay device may be introduced in the path of the horizontal synchronizing signal to delay that by an equal amount. This, as indicated, has not been found necessary but lies well within te skill of the art.

The embodiment described is preferred because, inter alia, it is designed to operate with prevailing television broadcast standards; but generalization of the disclosure is obviously desirable. First, no procedure for transmitting accompanying sound signals has been described because the bandwidth of such signals is trivial relative to video bandwidths, and many means for multiplexing audio signals are available in the art.

The frequency of sampling oscillator 16 has been described as 16 times that of the horizontal synchronizing signals, or the line frequency. Generically, this factor of 16 may be designated as the integer M. The sampling pulses subdivide each horizontal line into M segments, so that there will be M samples taken during a given fast scan of a line. Within a given such segment, it is possible to select any one of 16 samples of video signal; but the number of such samples which may be taken depends upon the number of selectible outputs 32 on multiplexer 28, which is equal to the number of equally spaced taps 34 on delay line 36. While these are also 16 in the preferred embodiment, their number is determined by the parameters mentioned, not by the frequency of sampling oscillator 16; it may be different from M, and so merits separate general designation as N. $M \times N$ is the number of separate picture elements which the system can resolve in a given scanned line, the width of the gating pulse from sampling pulse generator 38 being appropriately adjusted. Since the time between successive samples is inversely proportional to M, increasing M will increase the bandwidth of the sampled signals applied to terminal 60, and decreasing M will decrease the bandwidth. To maintain the same resolution, the value of N must be varied inversely to the variation in M, so that the product $M \times N$ remains the same. Doubling M, for example, would require doubling the frequency of sampling oscillator 16 and adding a binary counting stage to binary counter 20 in order that its output may still match the horizontal line frequency; delay line driver 30 would have to be driven from the first stage of binary counter 20. The number of selectible terminals of multiplexer 28 and the number of taps on delay line 36 would be halved, in order to halve N. One less binary stage would be required in sampling counter 26, since this would suffice to select the now halved number of selectible outputs 32 of multiplexer 28. However, since M has been doubled the number of samples taken in a single line sweep has been doubled, and the slow scan frame rate has been doubled in consequence. To take account of this, four stage binary counter 46 would be reduced to three stages. To reverse this procedure — that is, to halve M and double N — would require adding a binary stage to those counters described as having had one stage removed, and removing one stage from counters described as having had a stage added. The number of selectible terminals of multiplexer 28 and the number of taps on delay line 36 must be doubled; and a frequency doubler must be inserted in the line driving delay line driver 30. For either case, corresponding changes must be made in the receiving system. It is thus evident that it is not necessary that M be equal to N, but such equality produces a very convenient embodiment.

For a more generic description of my invention, it is convenient to describe certain groups of elements in generic terms, and omit specific reference to certain elements which, while technically useful or even necessary, perform functions subsidiary to the essential conceptual elements, and may be subsumed in the more generic groups of which they form a part. Thus terminal 10 is a source of wide-band television signals comprising video signals representative of picture elements, horizontal synchronizing signals, and vertical synchronizing signals. References 14, 16, and 18 are a source of sampling oscillations of a sampling frequency which is a multiple by an integer M of the frequency of the horizontal synchronizing signals, and is synchronous in frequency and phase with them. Reference 20 is dividing means to divide the sampling oscillations by M and produce a quotient output oscillations of the frequency of the horizontal synchronizing signals. References 28 and 36 are delay means connected to the source of sampling oscillations to delay them by a time delay which is less than the period of the sampling oscillations and alterable to any of N discrete values; and reference 26 is sampling counter means to receive the quotient output of reference 20 and alter that time delay. References 45, 46, 48, 50, and 52 constitute reset pulse generator means which receive the vertical synchronizing signals and produce reset signals at a period which is an integral multiple of FN times the period of the vertical synchronizing signals, where F is the number of fields per frame in the high-speed television signal. The logic underlying this somewhat exoteric description is this: The number N is the number of separate picture elements in a picture segment, only one of which is sampled in a given line scan, so that it requires N such scans to sample all the picture elements in a given line. But in a two-line interlaced system, to sample all the picture elements in a frame will require 2N scans because there are two fields per frame. While it is preferable to reset the various counters every full frame to minimize accidental asynchronism, it is theoretically possible to reset only every I full frames, where I is an integer not necessarily unity. The reset pulse generator means includes references 45 and 46, which are connected to 62 and 64 to provide counter reversing signals of frequency an integral multiple (twice, in the embodiment) of the frequency of the reset signals, and they feed such signals to counter control 58, which may be more functionally described as counter reversing means connected to the sampling counter means 58 to reverse the direction of its counting, which 58 does by steering the stepping pulses either to channel U or channel D.

The broad descriptions given thus far pertain particularly to the transmitting system, but are generally applicable to their homologues in the receiving system. However, the presence of pulse delay 68 in the receiving system requires a modified broad definition of the delay means of the receiving system as delaying the sampling oscillations by a first time delay, which will be that produced by reference 68 and by a second alterable time delay, which is that produced by the selection of different ones of taps 34 on delay line 36. While the delay produced by 68 is preferably adjustable to an optimum value, it will not ordinarily be altered as part of the regular functioning of the receiving system, while the delay produced by the delay line 36 must be regularly altered as part of the operation of the system.

References 70, 72, and 74 have no exact counterpart in the transmitting system, and may be described as frame synchronizing means. The output of 72 is connected, via reference 76, to provide counter reversing signals. The remaining components of the receiving system are adequately identified by the names given them in the description of the embodiment.

What is claimed is:

1. A transmitting system for selectively transmitting signals representative of individual elements of a succession of pictures in a first wide-band television for transmission in a second frequency band narrower than the first, comprising:

*a.* a source of first wide-band television signals comprising video signals representative of picture elements, horizontal synchronizing signals, and vertical synchronizing signals;

*b.* a source of sampling oscillations of a sampling frequency which is a multiple by an integer M of the frequency of the horizontal synchronizing signals and is harmonically related in frequency and phase therewith, connected to

*c.* dividing means to divide the sampling oscillations by the integer M and thus produce as its quotient output oscillations of the frequency of the horizontal synchronizing signals;

*d.* delay means connected to the source of sampling oscillations to delay the said oscillations by a time delay less than their period and alterable to any of N discrete values, and apply the delayed oscillations to open,

*e.* a video sampling gate connected to pass a sample of the video signals of the first wide-band television signals to a

*f.* holding circuit for storing the said sample;

*g.* sampling counter means connected to receive the quotient output of the dividing means (*c*) and, responsively thereto, to alter the time delay produced by the delay means (*d*);

*h.* reset pulse generator means connected to receive the vertical synchronizing signals and, responsively thereto, to produce as an output reset signals whose period is an integral multiple of FN times the period of the vertical synchronizing signals, where F is the number of fields per frame in the first wide-band signals, and to transmit such reset signals to the sampling counter means (*g*) to reset that means to a reference condition, and to

*i.* output terminal means for the reset signals, for the sample signal stored in holding circuit (*f*) and for the horizontal synchronizing and vertical synchronizing signals.

2. The system claimed in claim 1 further comprising

*j.* mixer means to mix the reset signals with the sample signal stored in holding circuit (*f*), and with the horizontal synchronizing and vertical synchronizing signals, and to transmit the signals thus mixed to the said output terminals means (*i*).

3. The system claimed in claim 1 in which the reset pulse generator means (*h*) is connected to provide counter reversing signals of frequency an integral multiple of the frequency of the reset signals and to feed such counter reversing signals to

*k*. counter reversing means connected to the sampling counter means (*g*) to reverse the direction of its counts responsively to the counter reversing signals.

4. The system claimed in claim 3 in which the frequency of the counter reversing signals is twice the frequency of the reset signals.

5. The system claimed in claim 3 in which the therein said counter reversing means (*k*) comprises:

up-down binary counter means connected to receive the therein said counter reversing signals and to alter its state responsively thereto, connected to counter control means connected to receive the quotient output of the dividing means (*c*) recited in claim 1 and, responsively to the state of the up-down binary counter means, to transmit the said quotient output alternatively to a first input terminal and to a second input terminal of the sampling counter means (*g*), and the sampling counter means (*g*) is so constructed as to count increasingly signals applied to a first input terminal with which it is provided, and to count decreasingly signals applied to a second input terminal with which it is provided.

6. The system claimed in claim 1 in which the therein said delay means (*d*) comprises a tapped delay line, the therein said alterable delay is altered by altering connections thereto.

7. The system claimed in claim 1 in which the therein said delay means (*d*) comprises:

a multiplexer having a common terminal connected to the source of sampling oscillations (*b*), having a plurality of selectible terminals; and having a plurality of control terminals for the application of signals determinative which selectible terminal is selected to be connected to the common terminal;

a delay line having a plurality of equally spaced taps, each of which is connected to a selectible terminal of the multiplexer, and a common terminal which is connected to the video sampling gate (*e*); and the therein said sampling counter means (*g*) comprises a multistage binary counter whose stage outputs are so connected to control terminals of the multiplexer that the state of the said multistage binary counter determines which one of the selectible terminals of the multiplexer is selected to be connected to the common terminal of the multiplexer.

8. A receiving system for receiving transmitted signals comprising selectively sampled signals representative of individual elements of a succession of pictures, mixed with horizontal and vertical synchronizing signals and reset signals, such as are transmitted by the transmitting system claimed in claim 1, and presenting a visual representation of the said pictures, comprising:

a. a source of the said transmitted signals;

*b*. a source of sampling oscillations of a sampling frequency which is the same as the sampling frequency employed in the system for transmitting the said transmitted signals, and is harmonically related in frequency and phase with the horizontal synchronizing signals comprised in the transmitted signals;

*c*. dividing means connected to the source of sampling oscillations (*b*) to divide their frequency by its ratio to the frequency of the horizontal synchronizing signals in the transmitted signals and thus produce as its quotient output oscillations of the frequency of the said horizontal synchronizing signals;

*d*. delay means connected to the source of sampling oscillations to delay them by a first time delay less than their period, and by a second alterable time delay less than their period and to apply the thus doubly delayed oscillations to open

*e*. video sampling gate means connected to receive the said selectively sampled signals and to pass as an output a time-selected part thereof for transmission to picture reproducing means scanned at a speed compatible with the duration of the time-selected part;

*f*. sampling counter means connected to receive the quotient output of the dividing means (*c*) and, responsively thereto, to alter the second time delay means produced by the delay means (*d*) in the predetermined sequence employed in selectively sampling the transmitted signals.

*g*. frame synchronizing means connected to receive reset signals from the source recited in (*a*) hereof and, responsively thereto, to produce as an output frame synchronizing signals and to apply them to the sampling counter means (*f*) to reset that means to a reference condition;

*h*. connecting means connected to receive the output of video sampling gate means (*e*) and the vertical and horizontal synchronizing signals, and transmit them to scanned picture reproducing means.

9. The system claimed in claim 8, in which the therein said connecting means (*h*) comprises means to mix the output of the video sampling gate means (*e*) and the vertical and horizontal synchronizing signals, and transmit the thus mixed signals to scanned picture reproducing means.

10. The system claimed in claim 8 further comprising:

*i*. scanned picture reproducing means connected to receive the signals transmitted by therein said mixer means (*h*) and, responsively thereto, to scan at rates compatible with the vertical and horizontal synchronizing signals, and to display as picture elements in the raster produced by such scan the signals which are the output of the video sampling gate means (*e*).

11. The system claimed in claim 8 in which the therein said alterable delay is altered by altering connections to a tapped delay line.

12. The system claimed in claim 8 in which the therein said delay means (*d*) comprises a multiplexer whose common terminal is connected to the source of sampling oscillations (*b*), whose various selectible terminals are connected to equally spaced taps on a delay line whose common terminal is connected to the therein said video sampling gate means (*e*), and the therein said sampling counter means (*f*) comprises a multistage binary counter whose stage outputs are so connected to the control terminals of the multiplexer that the state of the said counter determines which one of the various selectible terminals is selected to be connected to the common terminal of the multiplexer.

13. The system claimed in claim 8 in which the vertical synchronizing signal from the therein said source (*a*) of transmitted signals is connected to provide counter reversing signals of frequency an integral multiple of the frequency of the frame reset signals and to feed such counter reversing signals to

*j.* counter reversing means connected to the sampling counter to reverse the direction of its count responsibly to the counter reversing signals.

14. The system claimed in claim 13 in which the frequency of the counter reversing signals is twice the frequency of the frame synchronizing signals.

15. The system claimed in claim 13 in which the therein said counter reversing means (*j*) comprises:

up-down binary counter means connected to receive the therein said counter reversing signals and alter its state responsively thereto, connected to counter control means connected to receive the quotient output of the dividing means (*c*) recited in claim 8, and, responsively to the state of the up-down binary counter means, to transmit the said quotient output alternatively to a first input terminal and to a second input terminal of the sampling counter means (*f*)

the sampling counter means (*f*) being so constructed as to count increasingly signals applied to its first input terminal and to count decreasingly signals applied to its second input terminal.

16. The system claimed in claim 8 in which the therein said frame synchronizing means (*g*) comprises:

a long vertical synchronizing signal shaper connected to receive the vertical synchronizing signal from the therein said source (*a*), which may contain serrations, and produce responsively thereto a signal without such serrations, connected to apply that signal to a frame synchronizing signal simulator which, responsively to the trailing edge thereof, produces a simulated frame synchronizing signal for every vertical synchronizing signal, the simulated frame synchronizing signal beginning only after the vertical synchronizing signal has ceased, connected to apply the simulate frame synchronizing signal to one input of a frame synchronizing signal gate, which is a two-input "AND" gate, whose other input is connected to receive the vertical synchronizing signals and the reset signals from the source (*a*) recited in claim 8, and whose output is the output frame synchronizing signals recited in recital (*g*) of claim 8.

17. The system claimed in claim 16 in which the output of the therein said frame synchronizing signal simulator is connected to a counter which is connected to periodically reverse the direction of counting of the sampling counter means recited in (*f*) of claim 8.

* * * * *